United States Patent
Zambrano et al.

(10) Patent No.: US 8,700,540 B1
(45) Date of Patent: Apr. 15, 2014

(54) SOCIAL EVENT RECOMMENDATIONS

(75) Inventors: Brian Richard Zambrano, San Francisco, CA (US); Luke O'Daniel Groesbeck, San Francisco, CA (US)

(73) Assignee: Eventbrite, Inc., San Francisco, CA (US)

( * ) Notice: Subject to any disclaimer, the term of this patent is extended or adjusted under 35 U.S.C. 154(b) by 303 days.

(21) Appl. No.: 12/955,739

(22) Filed: Nov. 29, 2010

(51) Int. Cl.
*G06Q 99/00* (2006.01)
*G06F 7/00* (2006.01)
*G06F 17/30* (2006.01)

(52) U.S. Cl.
USPC .......................... 705/319; 707/732; 707/751

(58) Field of Classification Search
USPC .................................. 705/319; 707/732, 751
See application file for complete search history.

(56) References Cited

U.S. PATENT DOCUMENTS

| | | | |
|---|---|---|---|
| 7,527,195 B2 | 5/2009 | Keithley et al. | |
| 7,636,779 B2 * | 12/2009 | Hayashi et al. | 709/224 |
| 8,136,145 B2 * | 3/2012 | Fetterman et al. | 726/3 |
| 8,208,905 B2 * | 6/2012 | Lee et al. | 455/412.2 |
| 8,239,364 B2 * | 8/2012 | Wable et al. | 707/706 |
| 8,316,056 B2 * | 11/2012 | Wable | 707/791 |
| 8,521,734 B2 * | 8/2013 | Walther et al. | 707/732 |
| 2007/0233736 A1 * | 10/2007 | Xiong et al. | 707/104.1 |
| 2008/0154696 A1 * | 6/2008 | Spiegelman et al. | 705/10 |
| 2009/0094175 A1 | 4/2009 | Provos et al. | |
| 2009/0192853 A1 | 7/2009 | Drake et al. | |
| 2009/0265106 A1 * | 10/2009 | Bearman et al. | 701/300 |
| 2009/0287687 A1 * | 11/2009 | Martire et al. | 707/5 |
| 2010/0094791 A1 | 4/2010 | Miltonberger | |
| 2010/0287368 A1 | 11/2010 | Shuster et al. | |
| 2010/0293090 A1 | 11/2010 | Domenikos et al. | |
| 2010/0312644 A1 * | 12/2010 | Borgs et al. | 705/14.55 |
| 2010/0325205 A1 * | 12/2010 | Murphy et al. | 709/204 |
| 2011/0022388 A1 * | 1/2011 | Wu et al. | 704/246 |
| 2011/0201317 A1 * | 8/2011 | Karandikar et al. | 455/414.1 |
| 2011/0208822 A1 * | 8/2011 | Rathod | 709/206 |
| 2012/0042320 A1 * | 2/2012 | Jamjoom et al. | 718/104 |
| 2012/0197749 A1 | 8/2012 | Gray | |
| 2012/0203698 A1 | 8/2012 | Duncan et al. | |

OTHER PUBLICATIONS

Gauthier, Bernard J M. The bonfire managers: A critical examination of event marketing. ProQuest Dissertations and Theses; 1996; ProQuest Dissertations & Theses Full Text.*

Eventbrite Blog, *Social Event Discovery*, http://blog.eventbrite.com/social-event-discover; Sep. 23, 2010; downloaded Nov. 29, 2010, Sep. 23, 2010.

* cited by examiner

*Primary Examiner* — Amanda Kirlin
(74) *Attorney, Agent, or Firm* — Baker Botts L.L.P.

(57) ABSTRACT

In one embodiment, a method includes accessing a plurality of event listings, accessing event information associated with the event listings, accessing social network information associated with a particular user, and ranking the event listings for the particular user based at least in part on the social network information and event information.

17 Claims, 7 Drawing Sheets

FIG. 4

SOCIAL EVENT RECOMMENDATIONS

TECHNICAL FIELD

The present disclosure generally relates to online event management systems and recommendation systems.

BACKGROUND

Many websites allow users to conduct a variety of actions online, such as view content, write reviews, order items, purchase tickets, etc. These websites often present the user with a plurality of actions to choose from and allow the user to select the type of action he would like to perform. Once the action is selected, the website typically redirects the client system of the user to a webpage where the action can be completed. For example, some websites allow users to organize events using an online event management system. An online event management system may allow an event organizer to organize and manage various aspects of an event, such as, for example, managing attendee registrations and selling tickets, promoting the event, and managing attendee check-in at the event. An online event management system may also allow users to view event listings, register for events, and purchase tickets for events.

An online social networking system typically operates with one or more social networking servers providing interaction between users such that a user can specify other users of the social networking system as "friends." A collection of users and the "friend connections" between users can form a social graph that can be traversed to find second, third, and more remote connections between users, much like a graph of nodes connected by edges can be traversed.

Internet users may maintain one or more accounts with various service providers, including, for example, online social networking systems and online event management systems. Online systems can typically be accessed using suitable browser clients (e.g., Firefox, Chrome, Internet Explorer).

BRIEF DESCRIPTION OF THE DRAWINGS

FIG. 4 illustrates an example display of a webpage with event recommendations.

DESCRIPTION OF EXAMPLE EMBODIMENTS

System Overview

Figure 1:
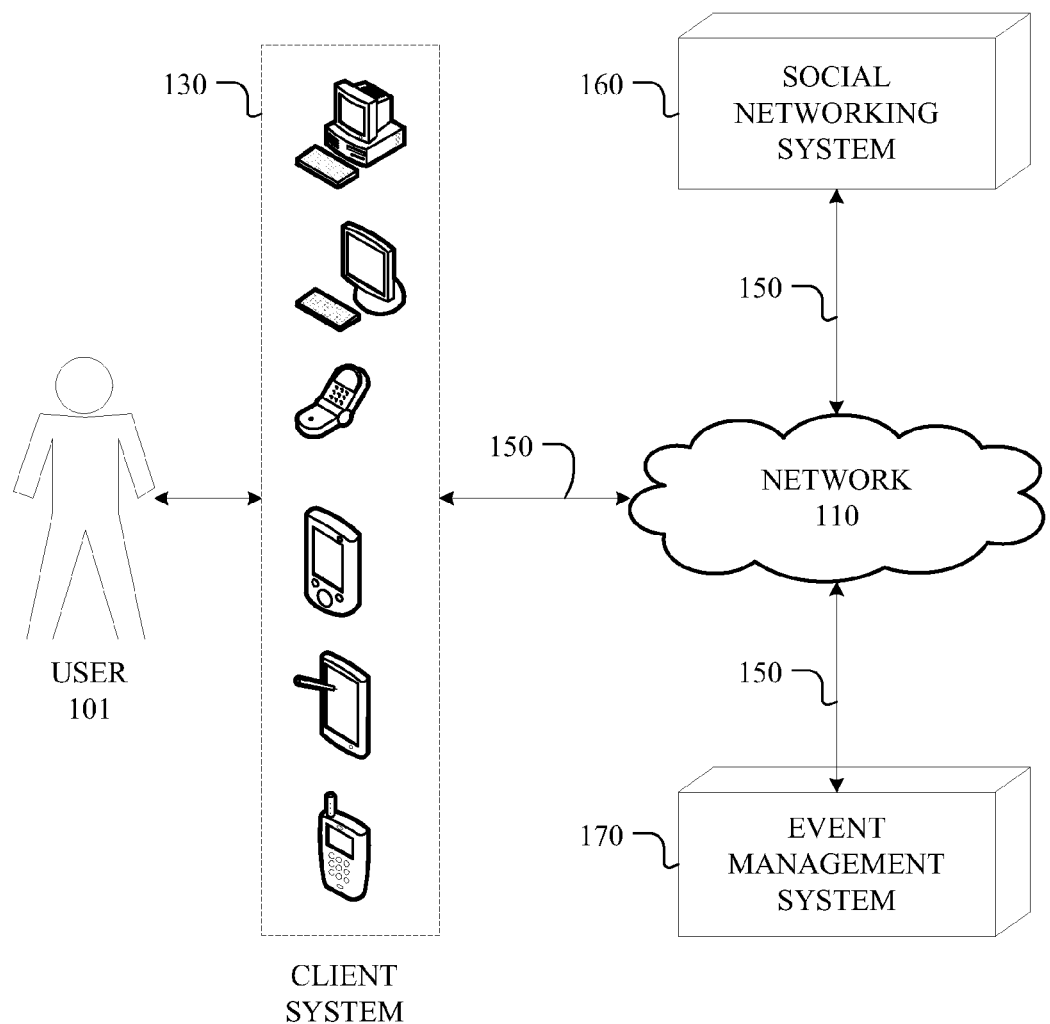
FIG. 1 illustrates an example system for implementing an online event management system and an online social networking system.

FIG. 1 illustrates an example system 100 for implementing an online event management system and an online social networking system. System 100 includes a user 101, a client system 130, a social networking system 160, and an event management system 170 connected to each other by a network 110. Although FIG. 1 illustrates a particular arrangement of user 101, client system 130, social networking system 160, event management system 170, and network 110, this disclosure contemplates any suitable arrangement of user 101, client system 130, social networking system 160, event management system 170, and network 110. As an example and not by way of limitation, two or more of client system 130, social networking system 160, and event management system 170 may be connected to each other directly, bypassing network 110. As another example and not by way of limitation, two or more of client system 130, social networking system 160, and event management system 170 may be physically or logically co-located with each other in whole or in part. Moreover, although FIG. 1 illustrates a particular number of users 101, client systems 130, social networking systems 160, event management systems 170, and networks 110, this disclosure contemplates any suitable number of users 101, client systems 130, social networking systems 160, event management systems 170, and networks 110. As an example and not by way of limitation, system 100 may include multiple users 101, client system 130, social networking systems 160, event management systems 170, and networks 110.

In particular embodiments, a social networking system 160 may be a network-addressable computing system that can host one or more social graphs. A social networking system 160 may generate, store, receive, and transmit social networking data, such as, for example, social graph details, friend connections details, user information, user inputs, and social network displays. A social networking system 160 may be accessed by the other components of system 100 either directly or via network 110. An event management system 170 may be a network-addressable computing system that can host one or more event organization and management systems. An event management system 170 may generate, store, receive, and transmit event-related data, such as, for example, event listings, event details, event history details, event registration details, event organizer details, event attendee details, ticket purchase details, and event displays. An event management system 170 may be accessed by the other components of system 100 either directly or via network 110. One or more users 101 may use one or more client systems 130 to access, send data to, and receive data from social networking system 160 or event management system 170. A client system 130 may access a social networking system 160 or an event management system 170 directly, via network 110, or via a third-party system. As an example and not by way of limitation, a client system 130 may access an event management system 170 via a social networking system 160. A client system 130 may be any suitable computing device, such as, for example, a personal computer, a laptop, a cellular phone, a smart phone, or a computing tablet.

Network 110 may be any suitable communications network. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Connections 150 may connect client system 130, social networking system 160, and event management system 170 to communication network 110 or to each other. This disclosure contemplates any suitable connections 150. In particular embodiments, one or more connections 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)) or optical (such as for example Synchronous Optical Network (SONET) or Synchronous Digital Hierarchy (SDH)) connections. In particular embodiments, one or more connections 150 each include an ad hoc network, an intranet, an extranet, a VPN, a LAN, a WLAN, a WAN, a WWAN, a MAN, a portion of the Internet, a portion of the PSTN, a cellular telephone network, another connection 150, or a combination of two or more such connections 150. Connections 150 need not necessarily be the same throughout system 100. One or more first connections 150 may differ in one or more respects from one or more second connections 150.

Social Graphs and Social Networking Systems

Social graphs are models of connections between users 101. A user 101 of a social graph may be any suitable entity, such as, for example, individuals, users, contacts, friends, players, businesses, groups, associations, concepts, or other suitable entities. A social graph can have a node for each user 101 and edges to represent relationships between users 101. A node in a social graph may represent any suitable user 101. An edge in a social graph may represent any suitable relationship between entities, such as, for example, an association, link, connection, friendship, grouping, pairing, union, or other suitable relationship. For purposes of illustration, an edge in a social graph may be referred to as a "friend connection," but this term is not meant to be limiting and a friend connection may represent and suitable relationship. In particular embodiments, a unique client identifier can be assigned to each user 101 in the social graph.

The minimum number of edges or friend connections required to connect a first user to second user on a social graph is considered the degree of separation between the users. For example, where the first user and the second user are directly connected (one edge), they are deemed to be separated by one degree of separation. The second user would be a so-called "first-degree friend" of the first user. Where the first user and second user are connected through one other user (two edges), they are deemed to be separated by two degrees of separation. The second user would now be a so-called "second-degree friend" of the first user. Where the first user and second user are connected through N edges (or N−1 other users), they are deemed to be separated by N degrees of separation. The second user would now be a so-called "Nth-degree friend." As used herein, the term "friend" means only first-degree friends, unless context suggests otherwise.

In particular embodiments, each user 101 of a social graph may have a social network within the social graph. A particular social network may be associated with a first user and may comprise the first user and set of second users of a social graph. A first user's social network may include all other users in the social graph within $N_{max}$ degrees of the first user, where $N_{max}$ is the maximum degree of separation allowed by the system managing the social graph (such as, for example, social networking system 160 or event management system 170). In some embodiments, $N_{max}$ equals 1, such that a user 101's social network includes only first-degree friends. In other embodiments, $N_{max}$ is unlimited and a user 101's social network is coextensive with the social graph.

In particular embodiments, one or more components of system 100 may function as a social graph host. A social graph host may be a network-addressable system that hosts and manages one or more social graphs, wherein each social graph comprises a plurality of users 101, and wherein each user 101 is associated with one or more social networks. As an example and not by way of limitation, a social graph may be managed by a social networking system 160 (e.g., Facebook, Friendster, Myspace). As another example and not by way of limitation, a social graph may be hosted and managed by event management system 170. As yet another example and not by way of limitation, social networking system 160 may host and manage one or more first social graphs and event management system 170 may host and manage one or more second social graphs.

In particular embodiments, a user 101 may have one or more first social networks on a first social graph host and one or more second social networks on a second social graph host. As an example and not by way of limitation, the user 101 may be a user of both event management system 170 and social networking system 160, and the user 101 may have one or more social networks on each system. The user 101 may have a social network on the event management system 170 that is a subset, superset, or independent of the user 101's social network on social networking system 160. Similarly, the user 101 may have a social network on the social networking system 160 that is a subset, superset, or independent of the user 101's social network on event management system 170.

In particular embodiments, a first system may host and manage an internal social graph and may also access one or more second systems that host and manage one or more external social graphs. For purposes of illustration, the first system will be referred to as the "internal system" and the one or more second system will be referred to as the "external systems." A user 101 may have an internal social graph on the internal system and an external social graph on the external system. As an example and not by way of limitation, event management system 170 may host and manage an internal social graph and may access an external social graph hosted and managed by social networking system 160. In particular embodiments, an internal system may maintain social graph information with edge type attributes that indicate whether a given friend connection is an "internal connection," an "external connection," or both. An internal connection may be an implicit or explicit friend connection between two users 101 of an internal system. Similarly, an external connection may be an implicit or explicit friend connection between two users 101 of an external system. As an example and not by way of limitation, the event management system 170 may maintain social graph information with edge type attributes that indicate whether a given friend connection is in the social graph hosted and managed by event management system 170 and therefore an "internal connection," is in the social graph hosted and managed by social networking system 160 and therefore an "external connection," or both. Although this disclosure describes particular systems hosting and managing particular social graphs and social networks, this disclosure contemplates any suitable systems hosting and managing any suitable social graphs and social networks. As an example and not by way of limitation, the internal and external social graphs and social networks described above may be hosted and managed by social networking system 160, event management system 170, or both.

Figure 2:
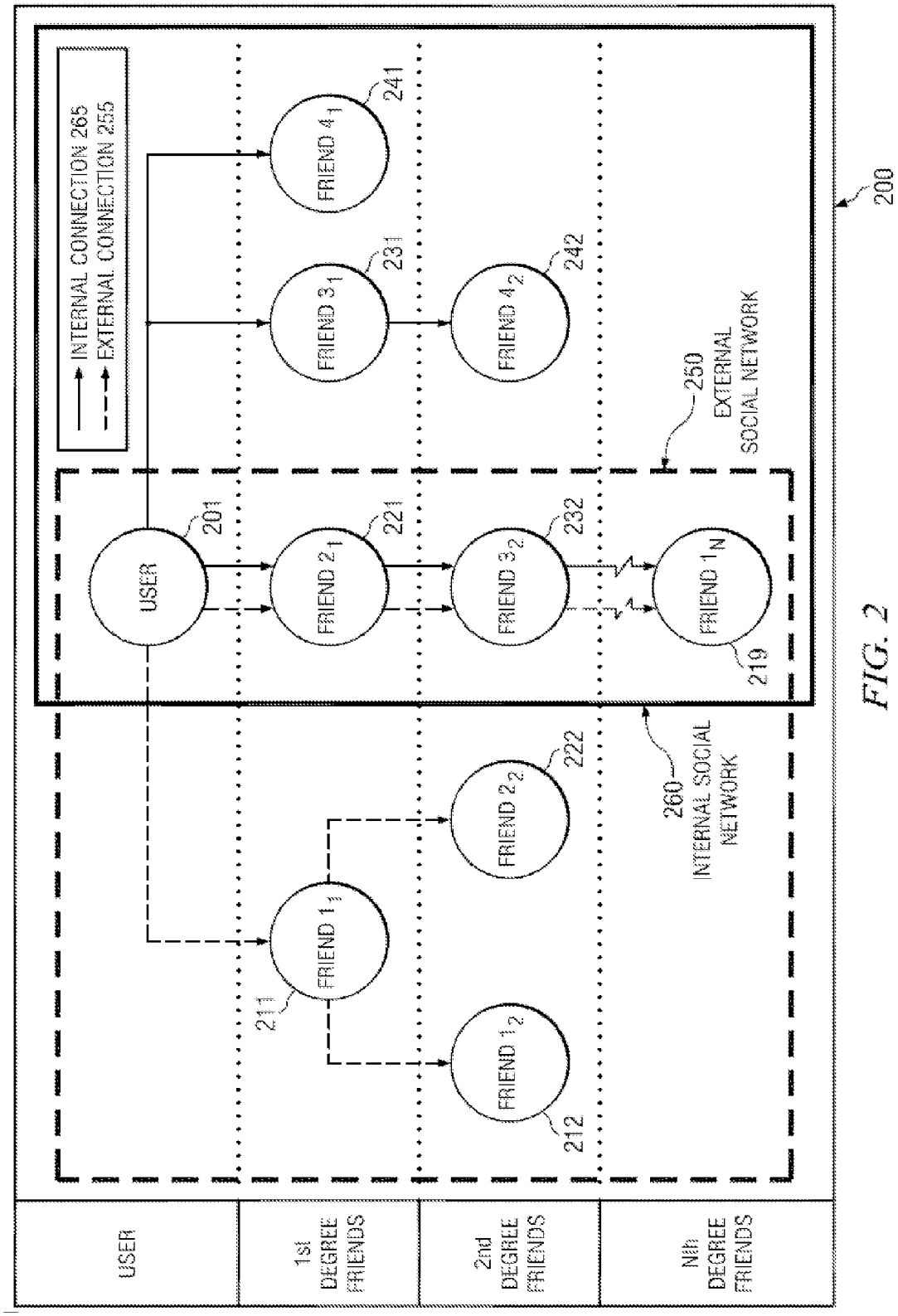
FIG. 2 illustrates an example social network.

FIG. 2 depicts an example of an internal social network 260 and an external social network 250. For purposes of illustration and not by way of limitation, the details of internal social network 260 and external social network 250 will be described with respect to User 201. User 201 is a node in the social networks and is connected to various other nodes within the social networks. For purposes of illustration and not by way of limitation, the other nodes connected to User 201 may be referred to as "friends," however the other nodes may be any suitable entity. Moreover, for purposes of illustration and not by way of limitation, the term "friend" can mean any node within a user's social network as used herein.

As shown in FIG. 2, User 201 has direct connections with several friends. When User 201 has a direct connection with a second node, the second node is referred to as a first-degree friend. User 201 has external connections 255 to a plurality of friends, forming external social network 250. Here, Friend $1_1$ 211 and Friend $2_1$ 221 are first-degree friends with User 201 in his external social network 250. User 201 also has internal connections 265 to a plurality of friends, forming internal social network 260. Here, Friend $2_1$ 221, Friend $3_1$ 231, and Friend $4_1$ 241 are first-degree friends with User 201 in his internal social network 260. In some embodiments, it is possible for a friend to be in both the external social network 250 and the internal social network 260. Here, Friend $2_1$ 221 has both an external connection 255 and an internal connection 265 with User 201, such that Friend $2_1$ 221 is in both User 201's internal social network 260 and User 201's external social network 250. In a social graph it is possible for individuals to be connected to other individuals through their first-degree friends (i.e., friends of friends). As described above, each edge required to connect a first user to a second user is considered the degree of separation. For example, FIG. 2 shows that User 201 has four second-degree friends that he is connected to via his connection to his first-degree friends. Here, second-degree Friend $1_2$ 212 and Friend $2_2$ 222 are connected to User 201 via his first-degree Friend $1_1$ 211. The limit on the depth of friend connections, or the number of degrees of separation for associations, that User 201 is allowed is typically dictated by the restrictions and policies implemented by the social graph host. In particular embodiments, User 201's social network may include Nth-degree friends connected to him through a chain of intermediary degree friends as indicated in FIG. 2. As an example and not by way of limitation, Nth-degree Friend $1_N$ 219 is connected to User 201 via second-degree Friend $3_2$ 232 and one or more other higher-degree friends. In particular embodiments, it is possible for User 201 to have a friend connected to him both in his internal and external social networks, wherein the friend is at different degrees of separation in each network. For example, if Friend $2_2$ 222 had a direct internal connection 265 with User 201, Friend $2_2$ 222 would be a second-degree friend in User 201's external social network, but a first-degree friend in User 201's internal social network. Various embodiments of this disclosure may take advantage of and utilize the distinction among the various degrees of separation between two nodes and the distinction between internal and external connections.

In particular embodiments, a social graph host may maintain social network information for users 101 of the social graph. Social network information may include a user 101's name, sex, geographic location, interests, employment history, education, schedule, relationships, groups, friend connections, friend connection scores, social graph usage history, and other suitable social network information. Social graph information may be generated by the user 101, such as, for example, by inputting the information into a social network profile. Social graph information may also be generated by the social graph host, such as, for example, by accessing other systems that have information associated with the user 101.

Implicit and Explicit Friend Connection

In particular embodiments, the friend connections in a user 101's social network can be formed explicitly (e.g., users must actively "friend" each other) or implicitly (e.g., system observes user behaviors and "friends" users to each other). As used herein, a "connection" or "friend connection" refers to a first-degree connection between two users 101 in a social graph. Various embodiments of this disclosure may take advantage of and utilize the distinction between implicit and explicit friend connection between two nodes.

In particular embodiments, a friend connection may be explicit when a first user and a second user indicate to a social graph host (such as, for example, social networking system 160 or event management system 170) that the system should establish an edge between their nodes in the social graph. As an example and not by way of limitation, User 201 may access a webpage associated with Friend $1_1$ 211's social network account and click "Add as Friend" to establish a friend connection. The social graph host may then require Friend $1_1$ 211 to accept or verify the friend request. If Friend $1_1$ 211 accepts the friend request, the social graph host may generate a connection between the two users on the social graph, thereby expanding the social networks of both users. Both internal connections 265 and external connections 255 can be formed explicitly.

In particular embodiments, a friend connection may be formed implicitly when a social graph host (such as, for example, social networking system 160 or event management system 170) determines that a relationship exists between two users. A social graph host may analyze social network information, event history information, and other suitable information to infer friend connections In particular embodiments, the social graph host may analyze social network information for one or more users 101 and infer friend connections therefrom. As an example and not by way of limitation, internal connections 265 may be generated by referencing an external social network 250. For example, if User 201 and Friend $2_1$ 221 are friends on external social network 250 (e.g., Facebook), the internal social graph host may presume a friend connection between them and create an internal connection 265 in their respective internal social networks 260. In particular embodiments, a user 101's internal social network 260 may comprise the user's entire external social network 250 and further comprise additional internal connections 265 formed explicitly or implicitly. As another example and not by way of limitation, the social graph host may form friend connections programmatically based a user 101's social network information (e.g., friend connections may be implied between all users in the same geographic area, in the same company, or in the same school).

In particular embodiments, the social graph host may analyze event history information for one or more users 101 and infer friend connections therefrom. As example and not by way of limitation, event management system 170 may analyze event history information for User 201 and infer friend connections based on this information. The event management system 170 may access User 201's event history information, which may identify one or more events User 201 has attended or has registered to attend, as well as the number, type, geographic location, venue, performer, other users in attendance at the event, and other suitable event information. For example, event management system 170 may identify that User 201 and Friend $3_1$ 231 attended a particular concert. The event management system 170 may prompt these users to add each other as friends on their internal social networks 260, or may even automatically create an internal connection 265 between them on the internal social graph.

In particular embodiments, the social graph host may analyze user behavior (which may be synchronous or asynchronous in nature, including interactions that may be widely separated in time) and infer friend connections therefrom. As an example and not by way of limitation, User 201 may access and view a webpage associated with Friend $4_1$ 241's social network account several times over the course of a week. The social graph host may then presume a friend connection between User 201 and Friend $4_1$ 241 based on User 201's viewing activity.

In particular embodiments, the social graph host may weight different factors differently when determining whether to form an implicit friend connection. As an example and not by way of limitation, the social graph host may only imply an internal connection 265 between two users when their "friend factor" exceeds a value of 1.0, where a bidirectional external connection between two users has a value of 0.7, a unidirectional external connection has a value of 0.4, and each concurrently attended event has a value of 0.2. Formation of the internal social network 260 may be aided by a rating system that allows users to provide feedback about other users in the social graph. Continuing the example above, giving another user a positive review has a value of 0.3, while giving that user a negative review has a value of −0.8.

Unless otherwise indicated, reference to a friend connection between two or more users 101 can be interpreted to cover both explicit and implicit connections. A friend connection may be unidirectional or bidirectional. It is also not a limitation of this description that two users 101 who are deemed "friends" with a social graph for the purposes of this disclosure are not friends in real life (i.e., in disintermediated interactions or the like), but that could be the case.

Scoring Friend Connections

In particular embodiments, friend connections may be given a score, such that friend connections between different nodes in a user 101's social network may have different scores. A score may represent the weight, value, rating, importance, or significance of a friend connection. A higher score may represent a more valuable or significant friend connection. As an example and not by way of limitation, a friend connection may be scored on a scale of 0 to 1.0, wherein a score of 0 represent no friend connection and a score of 1.0 represents a maximum friend connection. As another example and not by way of limitation, a friend connection may be scored on a scale of 1 to 10, wherein a score of 1 represents a minimum friend connection and a score of 10 represents a maximum friend connection. Although this disclosure describes using particular scales to score friend connections, this disclosure contemplates any suitable scale for scoring friend connections. As used herein, a "connection" or "friend connection" refers to a first-degree connection between two users 101 in a social graph. In particular embodiments, various factors can affect the scoring of a friend connection. Various embodiment of this disclosure may take advantage of and utilize the distinction among the various scores of various friend connections.

In some embodiments, only a subset of node pair combinations within a social graph may be given a friend connection score. As an example and not by way of limitation, the social graph host may only score implicit and explicit friend connections. In other embodiments, all node pair combinations within a social graph may be given a friend connection score. As an example and not by way of limitation, the social graph host may select any two nodes from the social graph and assign a friend connection score between the nodes even if no friend connection previously existed between the nodes. Although this disclosure describes scoring friend connections between particular nodes in a social graph, this disclosure contemplates scoring friend connections between any suitable nodes in a social graph.

In particular embodiments, the social graph host may score a friend connection between a first and second user based on the social network information associated with the first and second users. Social network information may include a user 101's name, sex, geographic location, interests, employment history, education, schedule, relationships, groups, friend connections, friend connection scores, social graph usage history, and other suitable social network information. In particular embodiments, the social graph host may score a friend connection between a first and second user based on the degrees of separation between the first and second users on a social graph. As an example and not by way of limitation, if two users of an external social graph are separated by two edges, their internal connection 265 may be given a score of +0.3 on an internal social graph based on their second-degree connection on the external social graph. As another example and not by way of limitation, if two nodes on an external social graph are separated by three edges, their internal connection may be given a score of only +0.1 on the internal social graph. In particular embodiments, the social graph host may score a friend connection between a first and second user based on the geographic locations of the first and second users. As an example and not by way of limitation, if the first user and second user both list "San Francisco" as their hometown, the social graph host may change the score of their friend connection by +0.1 based on their listing the same hometown. In particular embodiments, the social graph host may score a friend connection between a first and second user based on the interests of the first and second users. As an example and not by way of limitation, if a first user and a second user both list "Dungeons & Dragons" as an interest on their social network profiles, the social graph host may change the score of their friend connection by +0.2 based on their shared interest. In particular embodiments, the social graph host may score a friend connection between a first and second user based on their friend connection scores with a third user. As an example and not by way of limitation, if a first user and a second user both have high friend connection scores with a third user, the social graph host may increase the score of the friend connection between first and second users based on the strength of their friend connections with the third user. Although this disclosure describes scoring a friend connection based on particular social network information, this disclosure contemplates scoring a friend connection based on any suitable social network information.

In particular embodiments, the social graph host may score a friend connection between a first and second user based on the event history information associated with the first and second users. Event history information may include event information associated with one or more events a user 101 has attended or has registered to attend, as well as purchase history information associated with the events. In particular embodiments, the social graph host may score a friend connection between a first and second user based on the number of event attended concurrently by the first and second users. The social graph host may give higher friend connection scores to users that attend more events concurrently. As an example and not by way of limitation, if a first user and a second user concurrently attended a particular concert, the social graph host may change the score of their friend connection by +0.2. As another example and not by way of limitation, if the first and second users concurrently attended two particular events, the social graph host may change the score of their friend connection by +0.3. In particular embodiments, the social graph host may score a friend connection between a first and second user based on the type of events attended concurrently by the first and second users. The social graph host may give higher friend connection scores to users that concurrently attend particular types of events. As an example and not by way of limitation, attended a concert concurrently may change a friend connection score by +0.2 while attending a festival concurrently may change a friend connection score by +0.5. As another example and not by way of limitation, concurrently attending an event that costs $10 may change a friend connection less than concurrently attending an event that costs $200. In particular embodiments, the social graph host may score a friend connection between a first and second user based on the geographic location of the events attended by the first and second users. The social graph host may give higher friend connection scores to users that frequently visit the same venue, location, or place, either concurrently or separately. As an example and not by way of limitation, if a first user attends a concert at Golden Gate Park and a second user later attends an art exhibit at Golden Gate Park, the social graph host may change the score of their friend connection by +0.1 based on their attendance of events at the same location. Although this disclosure describes scoring a friend connection based on particular event history information, this disclosure contemplates scoring a friend connection based on any suitable event history information.

In particular embodiments, the scoring of friend connections may be based on whether the friend connections are explicit or implicit. As an example and not by way of limitation, a social graph host may assign an explicit friend connection a score of +0.4 and an explicit friend connection a score of +0.6.

In particular embodiments, the scoring of friend connections may be based on user feedback and reviews. As an example and not by way of limitation, a social graph host may include a rating system that allows users 101 to provide feedback about other 101 users in the social graph. If a first user gives a second user a positive review, that may increase the score of the friend connection between the first and second users. Similarly, if the first user gives the second user a negative review, that may decrease the score of the friend connection between the first and second users. For example, a positive review may change the score of a friend connection by +0.3, while a negative review may change the score of a friend connection by −0.8.

Figure 3:
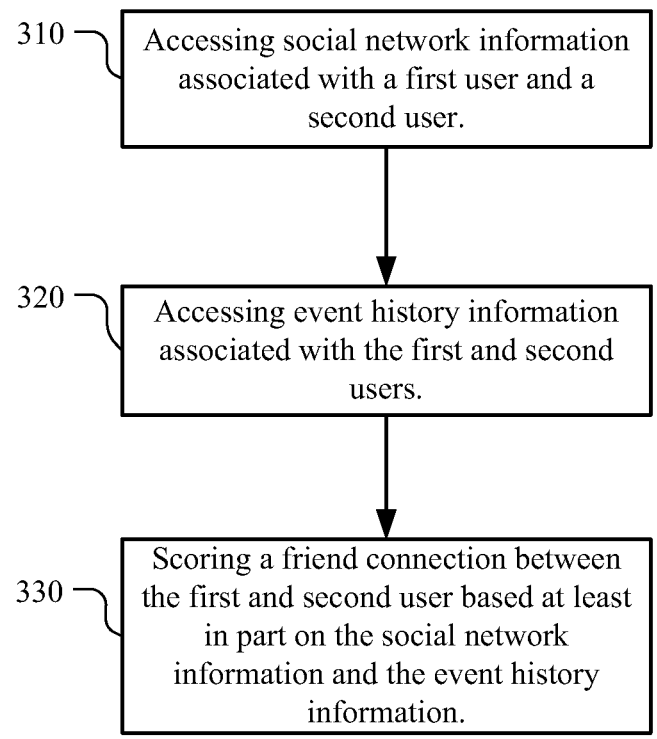
FIG. 3 illustrates an example method for scoring friend connections.

FIG. 3 illustrates an example method 300 for scoring friend connections. The method 300 begins at step 310, where an event management system 170 accesses social network information associated with a first user and a second user. The social network information may be from an internal social graph on event management system 170, from an external social graph on social networking system 160, or from both. At step 320, the event management system 170 accesses event history information associated with the first and second users. At step 330, the event management system scores a friend connection between the first and second user based at least in part on the social network information and the event history information. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Event Management Systems

In particular embodiments, an event management system 170 may allow users to organize and manage events. An event may be, for example, a party, a concert, a conference, a sporting event, a fundraiser, a networking event, or a live performance. Events may occur online (such as, for example, a web-based seminar) and offline (such as, for example, a live seminar in a lecture hall). An online event management system may allow an event organizer to organize and manage various aspects of an event, such as, for example, managing attendee registrations and selling tickets, managing funds from ticket sales, promoting the event, and managing attendee check-in at the event. An online event management system may also allow event attendees to view and manage various aspects of registering for an event, such as, for example, viewing event listings, viewing event information, viewing event history information, registering for events, and purchasing tickets for events. As an example and not by way of limitation, a first user may use event management system 170 to organize an event. The first user may input event information associated with the event. One or more second users may then use event management system 170 to register for the event. The second users may view an event listing associated with the event and then purchase tickets for the event. Although this disclosure describes particular types of events, this disclosure contemplates any suitable types of events. Moreover, although this disclosure describes organizing and managing particular aspects of an event, this disclosure contemplates organizing and managing any suitable aspects of an event.

In particular embodiments, each event that event management system 170 is managing has an associated event listing. An event listing may be accessed and displayed by any suitable client system 130. An event listing may have an event information associated with the event listing. Event information may include information describing the event date, type, cost, organizer, promoter, geographic location, venue, performer, attendees, and other suitable event information. Although this disclosure describes particular types of event information, this disclosure contemplates any suitable types of event information.

In particular embodiments, each user 101 of event management system 170 may have an event history information associated with the user 101. Event history information may include event information associated with one or more events a user 101 has attended or has registered to attend, as well as purchase history information associated with the event. Although this disclosure describes particular event history information, this disclosure contemplates any suitable event history information.

In particular embodiments, the event management system 170 may use unique client identifiers to identify a user 101. As an example and not by way of limitation, the event management system 170 may assign a unique client identifier to each client system 130. The event management system 170 may assign each client system 130 with an unique client identifier based on the IP address of the client system 130, tracking cookies on the client system 130 (which may be appended to HTTP requests transmitted by the client system 130), the serial number or asset tag of the client system 130, or other suitable identifying information. As another example and not by way of limitation, the event management system 170 may assign a unique client identifier to each user 101, which the user must provide to the event management system 170 via a client system 130. The event management system 170 may assign each user 101 with a username and password that the user 101 can input into client system 130, which then transmits the username and password to the event management system 170. In particular embodiments, the event management system 170 can use the unique client identifier to determine that the user 101 is accessing the system.

In particular embodiments, the event management system 170 may maintain an event management account for a user 101. The event management account may contain a variety of information about the user 101. As an example and not by way of limitation, an event management account may contain personal information (such as, for example, name, sex, location, and interests), social network information (such as, for example, friend connections), financial information (such as, for example, income and credit history), event history information (such as, for example, the type, data, cost, venue, performers, and geographic location of the events a user 101 has organized, registered for, or attended), and other suitable information related to the user 101.

In particular embodiments, an event management system 170 may use a "shopping cart" model to facilitate event registration. Event management system may present a user 101 with a plurality of event listings. The user 101 may select one or more of the events to register for. When the user 101 selects an event listing on event management system 170, the event management system 170 metaphorically adds that item to a shopping cart. When the user 101 is done selecting event listings, then all the items in the shopping cart are "checked out" (i.e., ordered) when the user 101 provides billing information (and possibly shipment information). In some embodiments, when a user 101 selects an event listing, then that event listing is "checked out" by automatically prompting the user for the billing and shipment information. The user 101 then may be presented with a registration webpage that prompts the user for the user-specific registration information to complete the registration. That webpage may be prefilled with information that was provided by the user 101 when registering for another event or when establishing a user account on event management system 170. The information may then be validated by event management system 170, and the registration is completed. At this point, the user 101 may be presented with a registration confirmation webpage that displays the details of the event and registration details.

Social Event Recommendations

In particular embodiments, event management system 170 may rank a set of event listings that are displayed to a user 101. A rank may represent the weight, value, rating, importance, or significance of an event listing. In particular embodiments, the rank of an event listing represents a calculation by event management system 170 of user interest in an event. Therefore, a higher rank may represent an event that a user 101 may be more interested in attending. As an example and not by way of limitation, an event listing may be ranked on a scale of 0 to 1.0, wherein a score of 0 represent no user interest and a score of 1.0 represents a maximum user interest. As another example and not by way of limitation, an event listing may be ranked in relation to all other event listing in the set, wherein each event listing is given a unique rank on a scale of 1 to n, where n is the number of event listings in the set. For example, if the set of event listings comprises five events, event management system 170 may assign each event listing a unique rank of 1, 2, 3, 4, or 5 based on the date of the event, where earlier events are given a higher rank. If the events are happening on Monday, Tuesday, Wednesday, Thursday, and Friday of this week, event management system may rank the Monday event as 5, the Tuesday event as 4, the Wednesday event as 3, the Thursday event as 2, and the Friday event as 1. Event management system 170 may then display these event listings to a user 101, such that event listings with higher ranks are listed more prominently. Although this disclosure describes using particular scales to rank event listings, this disclosure contemplates any suitable scale for ranking event listings. As used herein, a "connection" or "friend connection" refers to a first-degree connection between two users 101 in a social graph. In particular embodiments, various factors can affect the ranking of event listings. Various embodiment of this disclosure may take advantage of and utilize the distinction among the various ranks of various event listings.

Event management system 170 may calculate a rank for an event listing based on a variety of factors, such as, for example, event information associate with the event listing, social network information associated with a user 101, other suitable information, or two or more such factors. The following is an example algorithm that event management system 170 may use to calculate a rank for an event listing:

$$f_{rank} = f(E_1, \ldots, E_n, S_1, \ldots, S_m, H_1, \ldots, H_p)$$

where $f_{rank}$ is the rank for an event listing, $E_1, \ldots, E_n$ are event information 1 through n, $S_1, \ldots, S_m$ are social network information 1 through m, and $H_1, \ldots, H_p$ are event history information 1 through p.

The following is another example algorithm that event management system 170 may use to calculate a rank for an event listing:

$$f_{i,e} = a_1 \cdot E1_{i,e} + a_2 \cdot E2_{i,e} + a_3 \left( \frac{E1_{i,e} + E2_{i,e}}{T_e} \right)$$

where:

$f_{i,e}$ is the rank for a user i for an event listing and event listing e which belongs to a set of event listings $\epsilon$, $E1_{i,e}$ is the number of friends in the internal social network of user i who are registered to attend the event associated with event listing e, $E2_{i,e}$ is the number of friends in the external social network of user i who are registered to attend the event associated with event listing e, $T_e$ is the total number of users registered to attend event associated with event listing e, and $a_1, a_2, a_3$ are fixed variables.

Event listings may then be sorted based on their rank. Event listings with a ranking above a certain threshold may be displayed to a user 101. Although this disclosure describes calculating a rank for an event listing using a particular algorithm, this disclosure contemplates calculating a rank for an event listing using any suitable algorithm. Moreover, although this disclosure describes calculating a rank for an event listing using particular variables that represent particular information, this disclosure contemplates calculating a rank for an event listing using any suitable variables representing any suitable information.

In some embodiments, only a subset of event listings on event management system 170 may be given a ranking. As an example and not by way of limitation, event management system 170 may only rank event listings for events in a user 101's geographic area. In other embodiments, all event listings on event management system 170 may be given a ranking. Although this disclosure described ranking particular event listings, this disclosure contemplates ranking any suitable event listings.

In particular embodiments, the ranking of event listings may be based on social network information associated with a user 101. Social network information may include a user 101's name, sex, geographic location, interests, employment history, education, schedule, relationships, groups, friend connections, friend connection scores, social graph usage history, and other suitable social network information. In particular embodiments, event management system 170 may rank event listings based on the geographic location of the user 101. As an example and not by way of limitation, if user 101 lists "Manhattan" as his current city in his social network profile, event management system 170 may give upcoming events in New York City a higher rank than events in Ithaca based on user 101's current city. In particular embodiments, event management system 170 may rank event listings based on the interests of the user 101. As an example and not by way of limitation, if user 101 lists "polka music" among his interests in his social network profile, event management system 170 may give an upcoming polka music concert a higher rank based on user 101's interest in polka music. Although this disclosure describes ranking event listings based on particular social network information, this disclosure contemplates ranking event listings based on any suitable social network information.

In particular embodiments, event management system 170 may rank event listings based on event information associated with an event listing. Event information may include information describing the event date, type, cost, organizer, promoter, geographic location, venue, performer, attendees, and other suitable event information. In particular embodiments, event management system 170 may rank event listings based on type of event. The event management system 170 may give higher ranks to event listings for particular types of events. Event types that are typically more popular, interesting, or significant may be given higher ranks. As an example and not by way of limitation, if a first event is a concert and a second event is a wine tasting seminar, event management system may give the first event a higher rank than the second event based on the relative popularity of concerts versus wine tasting seminars. In particular embodiments, event management system 170 may rank event listings based on the date of the event. The event management system 170 may give higher ranks to event listings for events that are closer to occurring. As an example and not by way of limitation, if a first event occurs on October 14 and a second event occurs on October 23, the event management system 170 may give the first event a higher rank than the second event based on the temporal proximity of the first event. In particular embodiments, event management system 170 may rank event listings based on the cost to register for the event. The event management system 170 may give higher ranks to event listings for events that have a lower cost. As an example and not by way of limitation, if a first event costs $20 and a second event costs $15, the event management system 170 may give the second event a higher rank than the first event based on the lower cost of the second event. In particular embodiments, event management system 170 may rank event listings based on the geographic location of the event. The event management system 170 may give higher ranks to event listings for events that are geographically proximate to a particular location, such as, for example, a user 101's current location. Events that are in geographically remote, unpopular, or inaccessible locations may be given lower ranks. As an example and not by way of limitation, if a first event is in San Francisco and a second event is in the Galapagos Islands, the event management system 170 may give the first event a higher rank than the second event based on the geographic remoteness of the second event. Although this disclosure describes ranking event listings based on particular event information, this disclosure contemplates ranking event listings based on any suitable event information.

In particular embodiments, event management system 170 may rank event listings based on event history information associated with a user 101. Event history information may include event information associated with one or more events a user 101 has attended or has registered to attend, as well as purchase history information associated with the events. In particular embodiments, event management system 170 may rank event listings based on the number of events attended concurrently by a user 101 and one or more friends in the user's social network. The event management system 170 may give higher ranks to event listings for events that are similar to events a user 101 concurrently attended with a friend in the user's social network. As an example and not by way of limitation, user 101 may have attended a concert with one or more friends and later attended a poetry reading alone. A user 101 may be more likely to purchase tickets for an event that he can attend with friends. Therefore, the event management system 170 may give an upcoming concert a higher rank compared to an upcoming poetry reading based on user 101's history of attending concerts with friends. In particular embodiments, event management system 170 may rank event listings based on the type of events previously attended by a user 101. The event management system 170 may give higher ranks to event listings for particular types of events. As an example and not by way of limitation, if a user 101 has attended numerous comic book conventions previously, event management system 170 may give an upcoming comic book convention a high rank based on the user 101's history of attending coming book conventions. As another example and not by way of limitation, if a user 101 has never attended an event costing more than $100, event management system 170 may give an event costing more than $100 a low rank based on user 101's history of not attending more expensive events. In particular embodiments, event management system 170 may rank event listings based on the geographic location of events previously attended by a user 101. The event management system 170 may give higher ranks to event listings for events that are geographically proximate to events previously attended by the user 101. As an example and not by way of limitation, if a user 101 has attended events in San Francisco but has never attended an event in Oakland, event management system 170 may give an event in Oakland a low rank based on user 101's history of not attending events in Oakland. The event management system 170 may also give higher ranks to event listings for events that are geographically proximate to a user 101's current geographic location. As an example and not by way of limitation, if a user 101 lives in Palo Alto, event management system 170 may give an event in Los Angeles a low rank based on the distance between Palo Alto and Los Angeles. Although this disclosure describes ranking event listings based on particular event history information, this disclosure contemplates ranking friend listings based on any suitable event history information.

In particular embodiments, event management system 170 may rank event listings based on both social network information and event information. As an example and not by way of limitation, event management system 170 may rank event listings based on the number of friends in a user 101's social network that have registered to attend each event. Event management system 170 may access social network information (such as, for example, from social networking system 160) associated with the user 101 to identify one or more friends in the user 101's social network. Event management system 170 may then access event information associated with each event listing in a set of event listings. Event management system 170 may then determine the number of friends of the user 101 who are currently registered to attend each event. Event management system may then rank the event listings in the set based on the number of friends currently registered to attend each event, where events with more friends currently registered are given a higher rank than events with fewer friends currently registered to attend. Although this disclosure describes ranking event listings based on particular social network information and event information, this disclosure contemplates ranking friend listings based on any suitable combination of social network information, event information, and event history information.

In particular embodiments, event management system 170 may rank event listings based on user feedback and reviews. As an example and not by way of limitation, event management system 170 may include a rating system that allows users 101 to provide feedback about events. If a user 101 gives an event at a particular venue a positive review, the positive review may increase the rank of event listings for other events at that venue.

Figure 4:
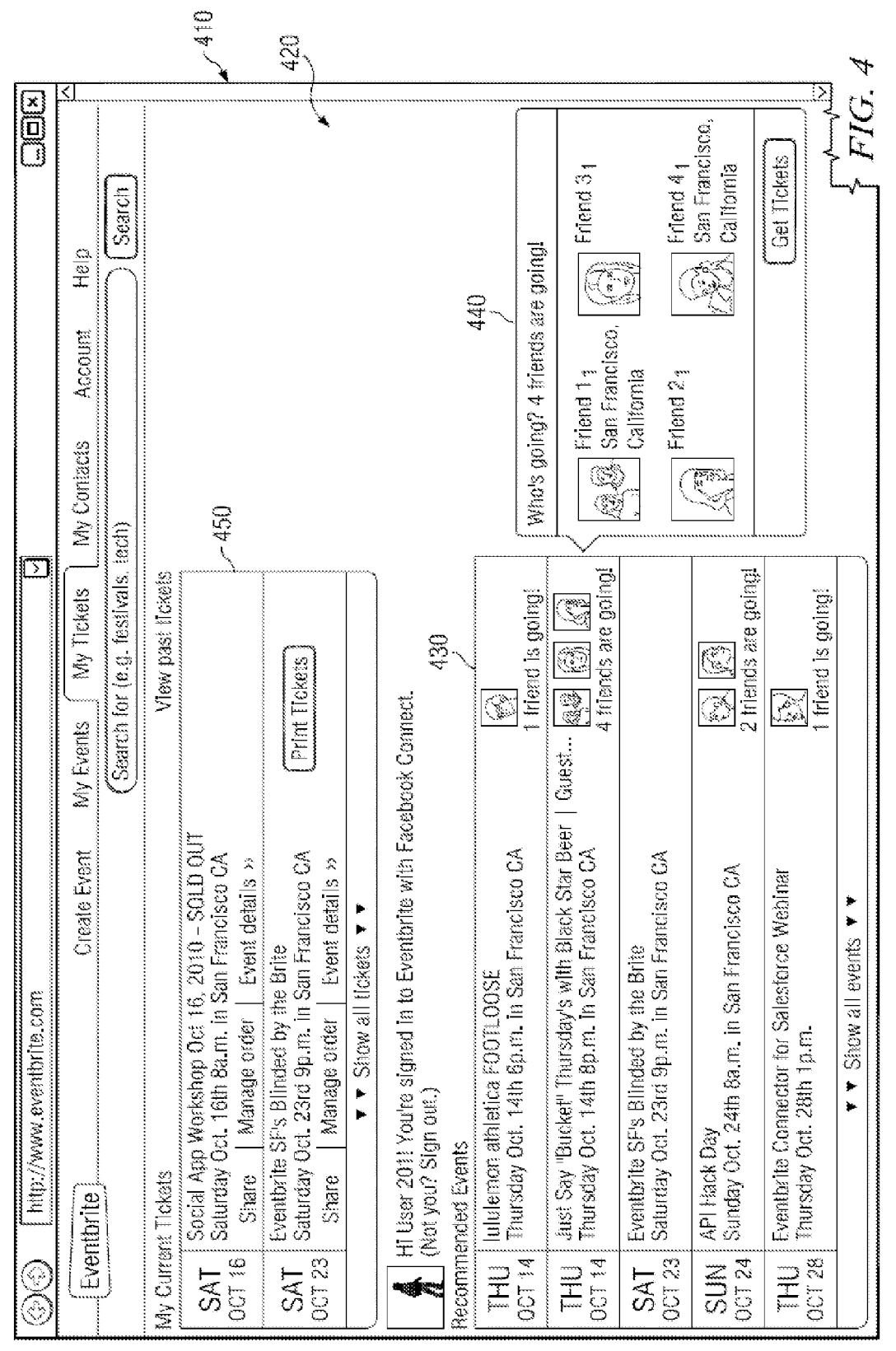

FIG. 4 illustrates an example display of a webpage 420 with event recommendations. In particular embodiments, event management system 170 may display event listings that have been ranked on the webpage 420. The webpage 420 illustrated in FIG. 4 may be automatically generated and presented to a user 101 in response to the user 101 visiting or accessing a website hosted by an event management system 170. The webpage 420 may be accessed by a client system 130 with a suitable browser client 410. This example webpage contains a recommended events section 430, a social details section 440, and a current registration section 450. In the example illustrated in FIG. 4, a particular user, User 201, is accessing the webpage 420. The recommended events section 430, social details section 440, and current registration section 450 all display information associated with User 201.

The recommended events section 430 contains a plurality of the event listings that event management system 170 has ranked and selected for display to User 201. As illustrated in FIG. 4, the event listings displayed in section 430 are a subset of the event listings managed by event management system 170 that User 201 has not yet registered to attend. Event management system 170 may manage hundred or thousands of event listings, however, it has selected subset of five events to recommend to User 201. The recommended events section 430 may be used to view one or more event listings that event management system 170 has ranked. In this example, the event management system 170 has ranked the event listings based at least in part on User 201's social network information and the event information associated with each event listing. Each event listing in section 430 displays the number of User 201's friends who are currently registered to attend that event. For example, four of User 201's friends are registered to attend the event "Just Say 'Bucket' Thursday's with Black Star Beer." Event management system 170 may have accessed User 201's social network information and the event information associated with these events to determine which events User 201's friends have registered to attend. Event management system 170 may rank events that User 201's friends have registered to attend more highly because User 201 may be more likely to purchase tickets for an event that his friends are also attending.

The social details section 440 contains a list of the friends in User 201's social network who have registered to attend a particular event. As illustrated in FIG. 4, the social details section 440 is displaying the friends in User 201's social network who have registered to attend the event "Just Say 'Bucket' Thursday's with Black Star Beer." The social details section 440 may be used to view which friends in User 201's social network are attending a particular event and social network information associated with those friends. The social details section 440 displayed in FIG. 4 shows the names, pictures, and geographic locations of the friends of User 201 who have registered to attend the event. User 201 may access the social details section 440 for an event listing by clicking on the event listing, mousing over the event listing, or otherwise interacting with the event listing.

The current registration section 450 contains a list of the events that User 201 is currently registered to attend. As illustrated in FIG. 4, the list displayed in section 450 is a subset of the events User 201 is currently registered to attend. The current registration section 450 may be used to view the event information associated with these events and to perform other actions, such as modifying User 201's registration information, purchasing more tickets, printing tickets, or checking-in for an event. The current registration section 450 displayed in FIG. 4 shows a subset of the events that User 201 is currently registered to attend. In this example, the events are listed in chronological order with the soonest event listed first.

Figure 5:
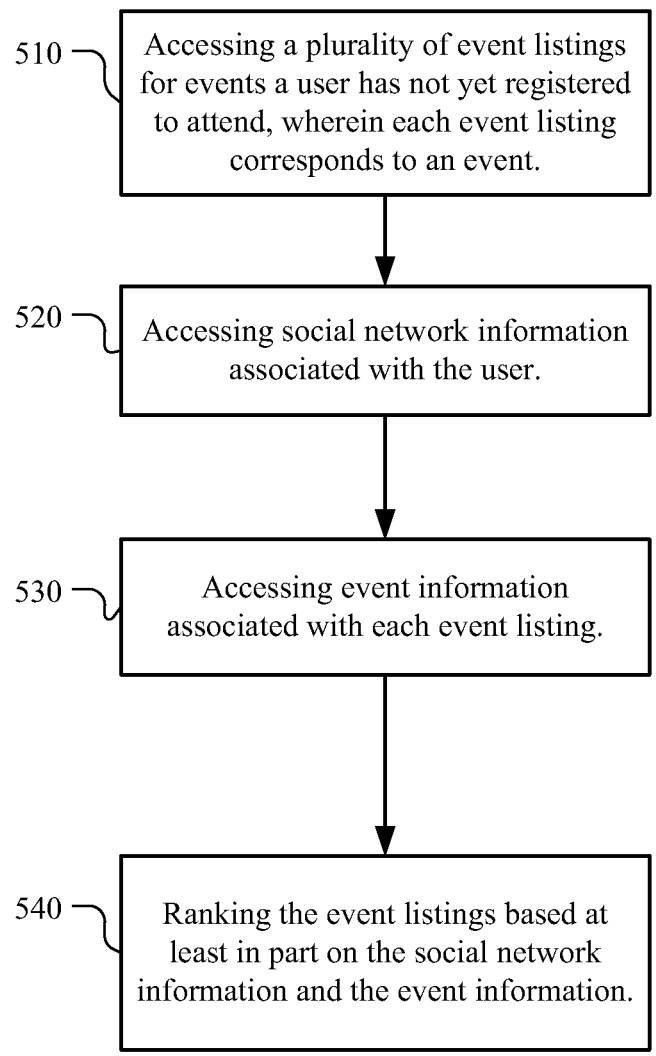
FIG. 5 illustrates an example method for ranking event listings.

FIG. 5 illustrates an example method 500 for ranking event listings. The method 500 begins at step 510, where an event management system 170 accesses a plurality of event listings for events a user 101 has not yet registered to attend. Each event listing corresponds to an event. At step 520, event management system 170 accesses social network information associated with the user 101. The social network information may be from an internal social graph on event management system 170, from an external social graph on social networking system 160, or from both. At step 530, event management system 170 accesses event information associated with each event listing. At step 540, event management 170 ranks the event listings based at least in part on the social network information and the event information. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Systems and Methods

Figure 6:
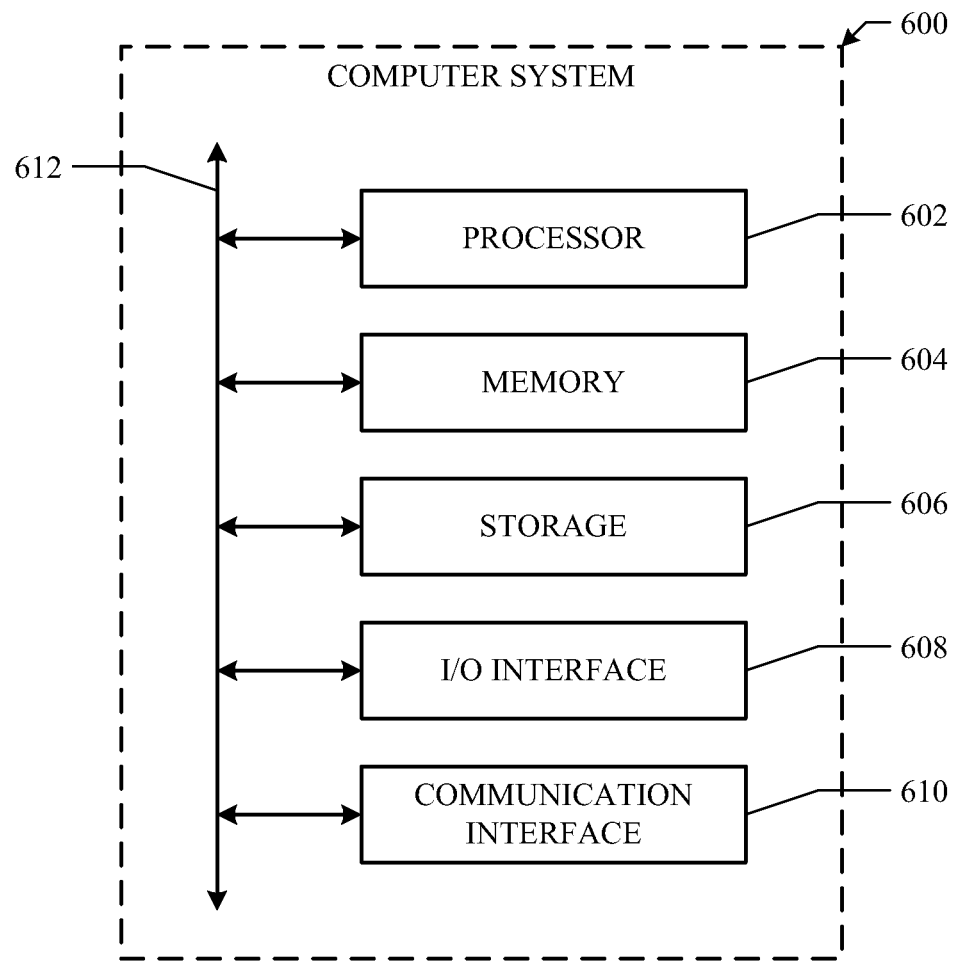
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 7:
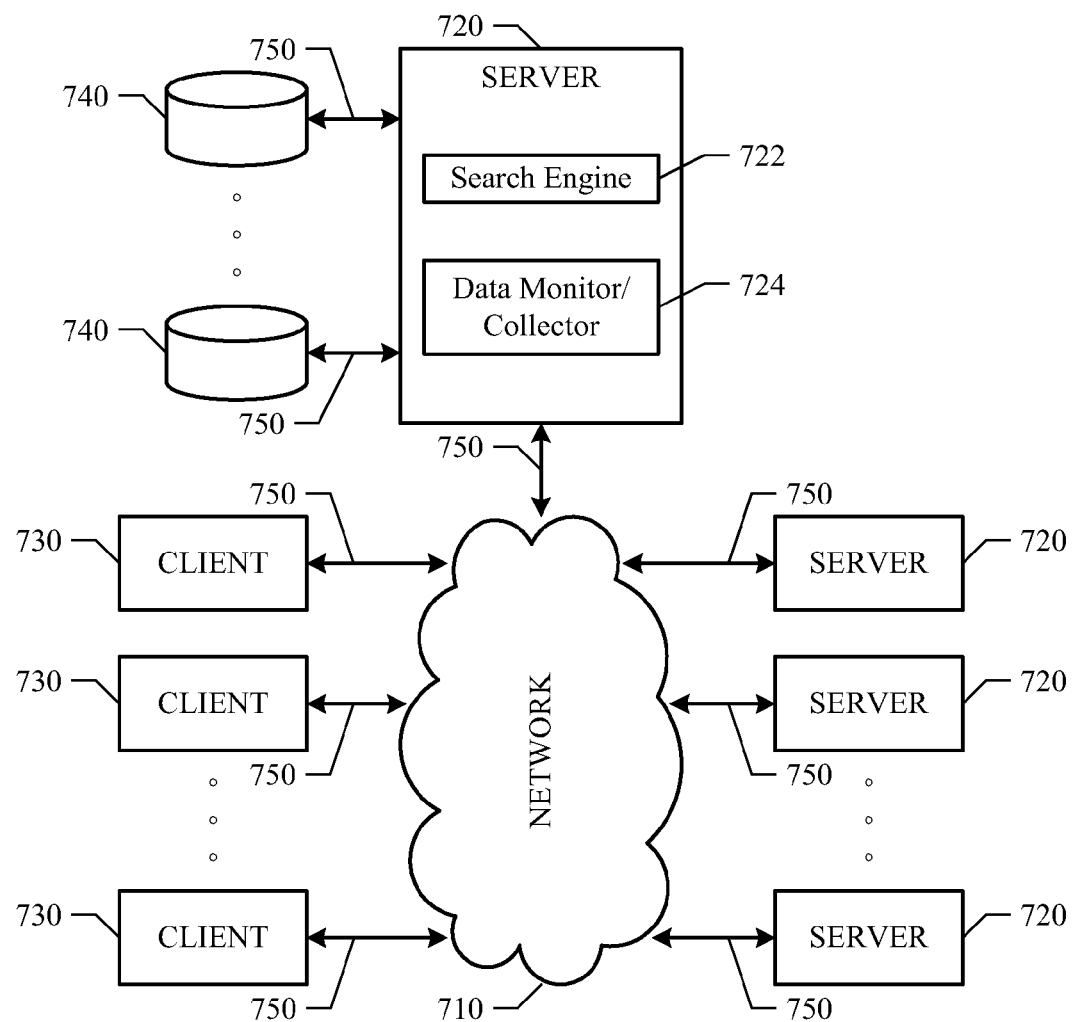
FIG. 7 illustrates an example network environment.

FIG. 7 illustrates an example network environment 700. This disclosure contemplates any suitable network environment 700. As an example and not by way of limitation, although this disclosure describes and illustrates a network environment 700 that implements a client-server model, this disclosure contemplates one or more portions of a network environment 700 being peer-to-peer, where appropriate. Particular embodiments may operate in whole or in part in one or more network environments 700. In particular embodiments, one or more elements of network environment 700 provide functionality described or illustrated herein. Particular embodiments include one or more portions of network environment 700. Network environment 700 includes a network 710 coupling one or more servers 720 and one or more clients 730 to each other. This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 couple servers 720 and clients 730 to network 710 or to each other. This disclsoure contemplates any suitable links 750. As an example and not by way of limitation, one or more links 750 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 750. In particular embodiments, one or more links 750 each includes an intranet, an extranet, a VPN, a LAN, a WLAN, a WAN, a MAN, a communications network, a satellite network, a portion of the Internet, or another link 750 or a combination of two or more such links 750. Links 750 need not necessarily be the same throughout network environment 700. One or more first links 750 may differ in one or more respects from one or more second links 750.

This disclosure contemplates any suitable servers 720. As an example and not by way of limitation, one or more servers 720 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 720 includes hardware, software, or both for providing the functionality of server 720. As an example and not by way of limitation, a server 720 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 730, the web server may communicate one or more such files to client 730. As another example, a server 720 that operates as a mail server may be capable of providing e-mail services to one or more clients 730. As another example, a server 720 that operates as a database server may be capable of providing an interface for interacting with one or more data stores (such as, for example, data stores 740 described below). Where appropriate, a server 720 may include one or more servers 720; be unitary or distributed; span multiple locations; span multiple machines; span multiple datacenters; or reside in a cloud, which may include one or more cloud components in one or more networks.

In particular embodiments, one or more links 750 may couple a server 720 to one or more data stores 740. A data store 740 may store any suitable information, and the contents of a data store 740 may be organized in any suitable manner. As an example and not by way or limitation, the contents of a data store 740 may be stored as a dimensional, flat, hierarchical, network, object-oriented, relational, XML, or other suitable database or a combination or two or more of these. A data store 740 (or a server 720 coupled to it) may include a database-management system or other hardware or software for managing the contents of data store 740. The database-management system may perform read and write operations, delete or erase data, perform data deduplication, query or search the contents of data store 740, or provide other access to data store 740.

In particular embodiments, one or more servers 720 may each include one or more search engines 722. A search engine 722 may include hardware, software, or both for providing the functionality of search engine 722. As an example and not by way of limitation, a search engine 722 may implement one or more search algorithms to identify network resources in response to search queries received at search engine 722, one or more ranking algorithms to rank identified network resources, or one or more summarization algorithms to summarize identified network resources. In particular embodiments, a ranking algorithm implemented by a search engine 722 may use a machine-learned ranking formula, which the ranking algorithm may obtain automatically from a set of training data constructed from pairs of search queries and selected Uniform Resource Locators (URLs), where appropriate.

In particular embodiments, one or more servers 720 may each include one or more data monitors/collectors 724. A data monitor/collection 724 may include hardware, software, or both for providing the functionality of data collector/collector 724. As an example and not by way of limitation, a data monitor/collector 724 at a server 720 may monitor and collect network-traffic data at server 720 and store the network-traffic data in one or more data stores 740. In particular embodiments, server 720 or another device may extract pairs of search queries and selected URLs from the network-traffic data, where appropriate.

This disclosure contemplates any suitable clients 730. A client 730 may enable a user at client 730 to access or otherwise communicate with network 710, servers 720, or other clients 730. As an example and not by way of limitation, a client 730 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 730 may be an electronic device including hardware, software, or both for providing the functionality of client 730. As an example and not by way of limitation, a client 730 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 730 may include one or more clients 730; be unitary or distributed; span multiple locations; span multiple machines; span multiple datacenters; or reside in a cloud, which may include one or more cloud components in one or more networks.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an event management system:
    accessing, by one or more of the computing devices, a plurality of event listings corresponding to a plurality of events, respectively, each event listing being associated with event information;
    identifying, by one or more of the computing devices, one or more event listings for events a first user has not yet registered to attend;
    accessing, from a 3rd-party social networking system that is external to the event management system, an external social graph comprising a plurality of nodes and a plurality of edges connecting the nodes, each edge between two node representing a single degree of separation between the two nodes, the plurality of nodes comprising:
        a first node corresponding to the first user; and
        a plurality of second nodes corresponding to a plurality of second users of the social networking system, respectively;
    generating, by one or more of the computing devices, internal social networking information associated with the first user based on the external social graph;
    accessing, by one or more of the computing devices, event history information associated with the first user and one or more second users;
    scoring, by one or more of the computing devices, one or more friend connections between the first user and one or more second users, respectively, based at least in part on applying a value to both the internal social network information and the event history information associated with the first user and each of the one or more second users;
    ranking, by one or more of the computing devices, the identified event listings based at least in part on the internal social network information, the scored friend connections between the first user and one or more of the second users, and the event information for each identified event listing; and
    generating, by one or more of the computing devices, a first set of identified event listings to recommend to the first user based on the ranking of the identified event listings.

2. The method of claim 1, wherein:
    the internal social networking information identifies one or more friends in the first user's social network;
    the event information for each identified event listing identifies the number of the one or more friends registered to attend the event corresponding to the event listing; and
    ranking the identified event listings further based at least in part on the number of friends in the first user's social network that have registered to attend each event corresponding to the identified event listings.

3. The method of claim 2, wherein:
    the internal social networking information further identifies one or more friend connections between the first user and the one or more friends registered to attend the event, wherein each friend connection has an associated score; and
    ranking the identified event listings is further based at least in part on the associated score of each friend connection of the one or more friends registered to attend the event.

4. The method of claim 1, wherein:
    the event information further identifies one or more of:
        the type of event;
        the date of the event;
        the cost to register for the event; and
        the geographic location of the event; and
    ranking the identified event listings is further based at least in part on one or more of:
        the type of event;
        the date of the event;
        the cost to register for the event; and
        the geographic location of the event.

5. The method of claim 1, further comprising:
    accessing event history information associated with the first user, wherein the event information identifies one or more of:
        the number of events attended concurrently by the first user and one or more friends in the first user's social network;
        the type of events attended by the first user; and
        the geographic locations of the events attended by the first user; and
    wherein ranking the event listings is further based at least in part on one or more of:
        the number of events attended concurrently by the first user and one or more of the friends;
        the type of events attended by the first user; and
        the geographic locations of the events attended by the first user.

6. The method of claim 1, further comprising displaying the first set of event listings to the first user.

7. The method of claim 1, wherein:
    the internal social networking information identifies one or more of:
        the degrees-of-separation between the first and second users in the external social graph; and
        the geographic locations of the first and second users; and
    scoring a friend connection between the first and one or more of the second users is further based at least in part on one or more of:
        the degrees-of-separation between the first and second users in the external social graph;
        the geographic locations of the first and second users.

8. The method of claim 1, wherein:
    the event history information identifies one or more of:
        the number of events attended concurrently by the first and second users;
        the type of events attended concurrently by the first and second users; and
        the geographic locations of the events attended by the first and second users; and
    scoring a friend connection between the first and second user is further based at least in part on one or more of:
        the number of events attended concurrently by the first and second users;
        the type of events attended concurrently by the first and second users; and
        the geographic locations of the events attended by the first and second users.

9. The method of claim 1, wherein generating the internal social networking information comprises generating an internal social graph comprising a plurality of internal nodes and a plurality of internal edges connecting the internal nodes, the plurality of internal nodes comprising:
  a first internal node corresponding to the first user; and
  a plurality of second internal nodes corresponding to a plurality of second users of the event management system, each second internal node corresponding to a second node of the external social graph from the 3rd-party social networking system.

10. The method of claim 1 wherein ranking the identified event listings is calculated using the following algorithm:

$$f_{i,e} = a_1 \cdot E1_{i,e} + a_2 \cdot E2_{i,e} + a_3\left(\frac{E1_{i,e} + E2_{i,e}}{T_e}\right), \text{ wherein:}$$

$f_{i,e}$ is a rank for the first user i for event listing e of the identified event listings $\epsilon$;
$E1_{i,e}$ is the number of second user in the internal social network of the first user i who are registered to attend the event associated with event listing e;
$E2_{i,e}$ is the number of second users in the external social network of the first user i who are registered to attend the event associated with event listing e;
$T_e$ is the total number of second users registered to attend event associated with event listing e; and
$a_1, a_2, a_3$ are fixed variables.

11. An event management system comprising: one or more processors; and a memory coupled to the processors comprising instructions executable by the processors, the processors operable when executing the instructions to:
  access a plurality of event listings corresponding to a plurality of events, respectively, each event listing being associated with event information; identifying, by one or more of the computing devices, one or more event listings for events a first user has not yet registered to attend;
  access, from a 3rd-party social networking system that is external to the event management system, an external social graph comprising a plurality of nodes and a plurality of edges connecting the nodes, each edge between two node representing a single degree of separation between the two nodes, the plurality of nodes comprising:
    a first node corresponding to the first user; and
    a plurality of second nodes corresponding to a plurality of second users of the social networking system, respectively;
  generate internal social networking information associated with the first user based on the external social graph;
  access event history information associated with the first user and one or more second users;
  score one or more friend connections between the first user and one or more second users, respectively, based at least in part on applying a value to both the internal social network information and the event history information associated with the first user and each of the one or more second users;
  rank the identified event listings based at least in part on the internal social network information the scored friend connections between the first user and one or more of the second users, and the event information for each identified event listing; and
  generate a first set of identified event listings to recommend to the first user based on the ranking of the identified event listings.

12. The system of claim 11, wherein:
  the internal social networking information identifies one or more friends in the first user's social network;
  the event information for each identified event listing identifies the number of the one or more friends registered to attend the event corresponding to the event listing; and
  to rank the identified event listings further based at least in part on the number of friends in the first user's social network that have registered to attend each event corresponding to the identified event listings.

13. The system of claim 12, wherein:
  the internal social networking information further identifies one or more friend connections between the first user and the one or more friends registered to attend the event, wherein each friend connection has an associated score; and
  to rank the identified event listings is further based at least in part on the associated score of each friend connection of the one or more friends registered to attend the event.

14. The system of claim 11, wherein:
  the event information further identifies one or more of:
    the type of event;
    the date of the event;
    the cost to register for the event; and
    the geographic location of the event; and
  to rank the identified event listings is further based at least in part on one or more of:
    the type of event;
    the date of the event;
    the cost to register for the event; and
    the geographic location of the event.

15. The system of claim 11, wherein the processors are further operable when executing the instructions to:
  access event history information associated with the first user, wherein the event information identifies one or more of:
    the number of events attended concurrently by the user and one or more friends in the first user's social network;
    the type of events attended by the first user; and
    the geographic locations of the events attended by the first user; and
  wherein ranking the event listings is further based at least in part on one or more of:
    the number of events attended concurrently by the first user and one or more of the friends;
    the type of events attended by the first user; and
    the geographic locations of the events attended by the first user.

16. The system of claim 11, wherein the processors are further operable when executing the instructions to display the first set of event listings to the first user.

17. One or more computer-readable non-transitory storage media embodying software that is operable when executed to:
  access a plurality of event listings corresponding to a plurality of events, respectively, each event listing being associated with event information;
  identify one or more event listings for events a first user has not yet registered to attend;
  access, from a 3rd-party social networking system that is external to the event management system, an external social graph comprising a plurality of nodes and a plurality of edges connecting the nodes, each edge between two node representing a single degree of separation between the two nodes, the plurality of nodes comprising:

a first node corresponding to the first user; and
a plurality of second nodes corresponding to a plurality of second users of the social networking system, respectively;
generate, by one or more of the computing devices, internal social networking information associated with the first user based on the external social graph;
access event history information associated with the first user and one or more second users;
score one or more friend connections between the first user and one or more second users, respectively, based at least in part on applying a value to both the internal social network information and the event history information associated with the first user and each of the one or more second users;
rank the identified event listings based at least in part on the internal social network information the scored friend connections between the first user and one or more of the second users, and the event information for each identified event listing; and
generate a first set of identified event listings to recommend to the first user based on the ranking of the identified event listings.

\* \* \* \* \*